United States Patent
Sawhney et al.

(10) Patent No.: US 6,927,366 B2
(45) Date of Patent: Aug. 9, 2005

(54) COOKING APPARATUS

(75) Inventors: Ravi K. Sawhney, Calabasas, CA (US);
Juan Pablo Cilia, Thousand Oaks, CA (US); William Debley, Jr., Northridge, CA (US); Lance Hussey, Simi Valley, CA (US)

(73) Assignee: RKS Design, Inc., Thousand Oaks, CA (US)

( * ) Notice: Subject to any disclaimer, the term of this patent is extended or adjusted under 35 U.S.C. 154(b) by 0 days.

(21) Appl. No.: 10/684,225

(22) Filed: Oct. 10, 2003

(65) Prior Publication Data

US 2005/0077283 A1 Apr. 14, 2005

(51) Int. Cl.[7] ............................. B01F 9/02; A47J 27/00; A47J 36/34; A47J 37/10
(52) U.S. Cl. .................. 219/438; 219/429; 219/432; 99/348
(58) Field of Search ................................. 219/429, 432, 219/433, 438, 385, 386, 389; 99/348, 351, 371, 451

(56) References Cited

U.S. PATENT DOCUMENTS

| | | | | |
|---|---|---|---|---|
| 4,173,925 A | * | 11/1979 | Leon ............................ | 99/348 |
| 4,503,502 A | * | 3/1985 | Chapin ........................ | 99/348 |
| 5,088,390 A | * | 2/1992 | Wong et al. ................. | 99/327 |
| 5,107,096 A | * | 4/1992 | Knees ......................... | 219/433 |
| 5,176,069 A | * | 1/1993 | Chen ........................... | 99/348 |
| 5,386,102 A | * | 1/1995 | Takikawa et al. ............ | 99/348 |
| 5,613,774 A | * | 3/1997 | Chandra et al. ............. | 99/348 |
| 6,629,491 B1 | * | 10/2003 | Chan ........................... | 99/348 |

FOREIGN PATENT DOCUMENTS

| | | | | |
|---|---|---|---|---|
| CA | CN1399934 A | * | 3/2003 | |
| GB | 2199509 A | * | 7/1988 | |
| JP | 01249020 A | * | 10/1989 | |
| JP | 06261831 A | * | 9/1994 | |
| JP | 09173216 A | * | 7/1997 | |
| JP | 11169301 A | * | 6/1999 | |
| JP | 2001-330 A | * | 1/2001 | |

* cited by examiner

*Primary Examiner*—J. Pelham
(74) *Attorney, Agent, or Firm*—Fellers, Snider, et al.; Daniel P. Dooley (57) ABSTRACT

A cooking apparatus for providing a tilting cooking surface. The cooking apparatus may include a cooking surface for receiving food; a motion element for providing movement to the cooking surface; and a coupling attached to the motion element. The coupling may traverse a periphery portion of the cooking surface, maintaining the cooking surface in a tilted position and rocking the cooking surface back and forth. The cooking apparatus may also include a heating element.

39 Claims, 7 Drawing Sheets

COOKING APPARATUS

CROSS-REFERENCE TO RELATED APPLICATIONS

Embodiments of the present invention relate to U.S. Provisional Application Ser. No. 60/397,250, filed Jul. 19, 2002, entitled "Portable Cooking Appliance," the contents of which are hereby incorporated by reference herein.

BACKGROUND

1. Field of the Invention

The present invention relates to the field of cooking apparatuses and, in particular, to cooking apparatuses that may be tilted, rotated or otherwise moved while food is being cooked in the cooking apparatus.

2. Description of Related Art

Cooking can be approached from a variety of perspectives. For some, cooking is simply a chore. To others, cooking is artistic expression. To still others, cooking is nothing more than a mundane necessity. However, one's perspective on cooking notwithstanding, the task of cooking can be burdensome. To prepare a meal that is palatable requires constant supervision of the cooking process.

Careful and undivided attention is a necessity while cooking. Food that is exposed to heat for too long without being turned over or moved may overcook or even burn. Food that does not receive enough heat or food that receives uneven heat may undercook. In either case, the resulting food may be poorly prepared and unpalatable or even unhealthy to eat.

Many attempts have been made to overcome some of the burdens associated with cooking. For example, many devices in the prior art attempt to alleviate cooks and chefs from the constant supervision of the cooking process by providing cooking apparatuses that rotate, causing food to tumble, thereby cooking food relatively evenly. However, many of these prior art devices are containers that completely enclose the food to prevent the food from exiting the container while being rotated. Thus, in these devices, it may not be possible to see the food while it cooks; attempts to visually observe the food while it is cooking may be frustrated. Because the food may not be visible or because visibility may be limited, it may not always be possible to determine precisely when the food inside the container is properly cooked. This may result in food that is unpalatable or even unhealthy.

In addition, enclosing the food in a container eliminates many of the benefits of "open-air" cooking. For example, in addition to not being able to see the food while it is cooking, the unique taste characteristics associated with food that is allowed to "breath" while cooking are unavailable. Thus, food cooked in these enclosed containers is generally not as tasteful as food that is prepared in an open container.

SUMMARY

It is therefore an object of the present invention to provide an apparatus that tumbles food or otherwise provides motion to food while cooking in an open container.

It is another object of the present invention to provide an apparatus that tumbles food or otherwise provides motion to food while cooking while simultaneously allowing an unobstructed view of the food.

According to embodiments of the present invention, a cooking apparatus may include a cooking surface for receiving food; a motion element for providing movement to the cooking surface; and a coupling fixedly attached to the motion element. The coupling may traverse a portion of the cooking surface. The coupling may be movably attachable to the cooking surface.

The cooking surface may tilt. For example, the cooking surface may tilt when the cooking surface is attached to the coupling. Also, the portion of the cooking surface traversed by the coupling may be a circumferential portion or a periphery of the cooking surface. The cooking surface may be curved or rectangular. The cooking surface may be a wok.

The cooking apparatus may also include a heating element coupled to the cooking surface. The heating element may be coupled to the cooking surface via air, fasteners or welds. Also, heat may be transferred from the heating element to the cooking surface via radiation, conduction or convection.

The motion of the motion element may be rotational or linear. The motion element may rotate the cooking surface via the coupling. The motion element may cause the coupling to traverse a portion of the cooking surface. The motion element may shake or move the cooking surface via the coupling. The motion element may be electrically, battery or mechanically powered. The motion element may also include a motor, a pinion coupled to the motor and a gear coupled to the pinion.

The coupling may include a roller and a ball plunger.

The cooking apparatus may also include a joint upon which the cooking surface is pivotally attached; a shaft disposed adjacent the cooking surface; a spring disposed adjacent the shaft, and a stopper for maintaining a position of the shaft. The joint may be disposed adjacent the shaft. The stopper may maintain the shaft in a first position and a second position. The spring may be in compression when the shaft is in the first position and the spring may act upon the shaft to force the shaft into the second position. The second position of the shaft may allow the cooking surface to be attached to the coupling.

According to another embodiment of the present invention, a wok may include a curved cooking surface; a motion element for providing rotational motion to the curved cooking surface; and a coupling fixedly attached to the motion element. The coupling may traverse a periphery of the curved cooking surface.

The curved cooking surface may be pivotally attached to a joint. The wok may also include a heating element.

BRIEF DESCRIPTION OF THE DRAWINGS

FIG. 6 shows an exploded view of a cooking apparatus according to another embodiment of the present invention.

DETAILED DESCRIPTION

In the following description of preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the preferred embodiments of the present invention.

Although the following description is directed primarily to a wok, it is to be understood that embodiments of the present invention may be adapted to any type of cooking apparatus or cooking surface. For example, embodiments of the present invention may be adapted to pans, baking dishes, fondue bowls, mixers, or virtually any type of cooking apparatus, cooking surface or cooking utensil used for cooking or preparing foods. Additionally, embodiments of the present invention may be adapted to indoor or outdoor cooking, such as barbecuing, for example, or may be adapted to cooking techniques used in various ethnic and regional cooking styles.

Figure 1:
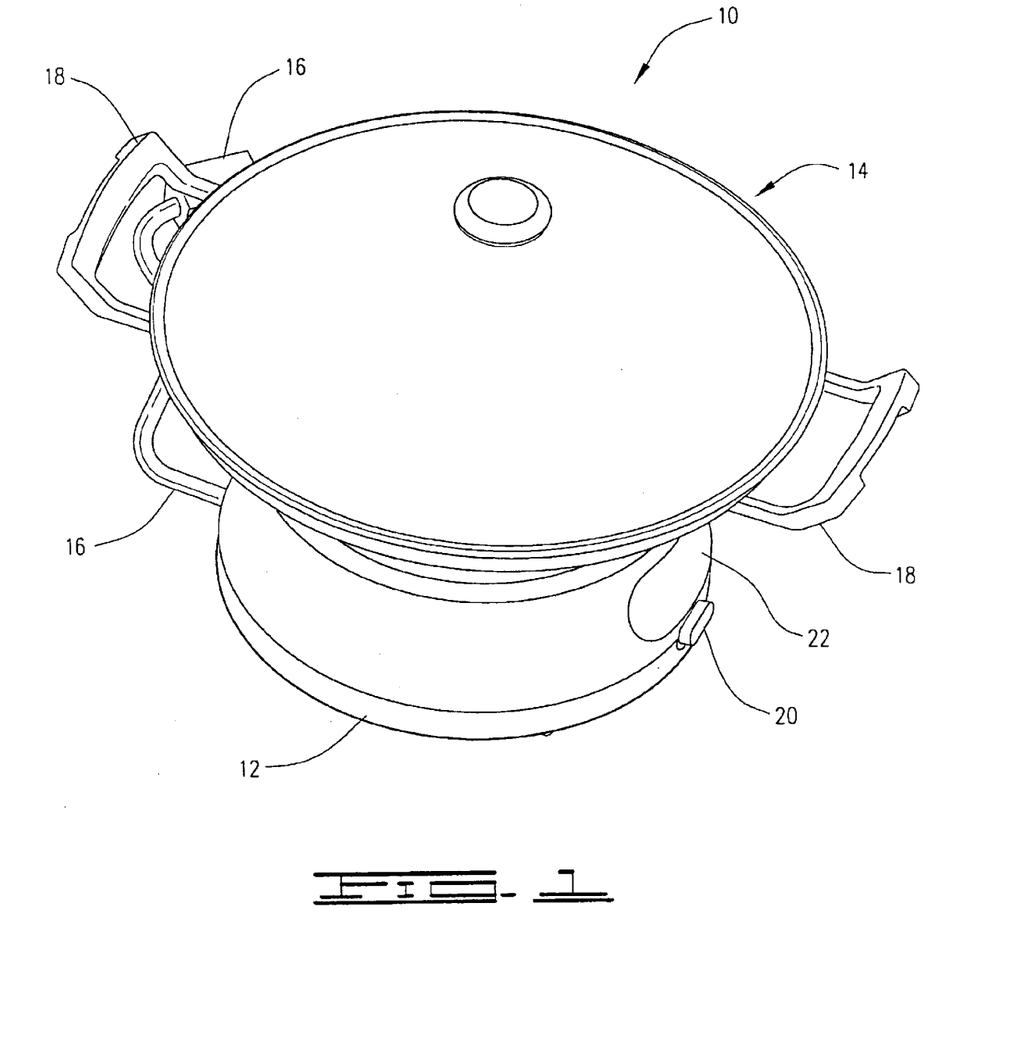
FIG. 1 shows a perspective view of a cooking apparatus in an upright position according to an embodiment of the present invention.
Figure 2:
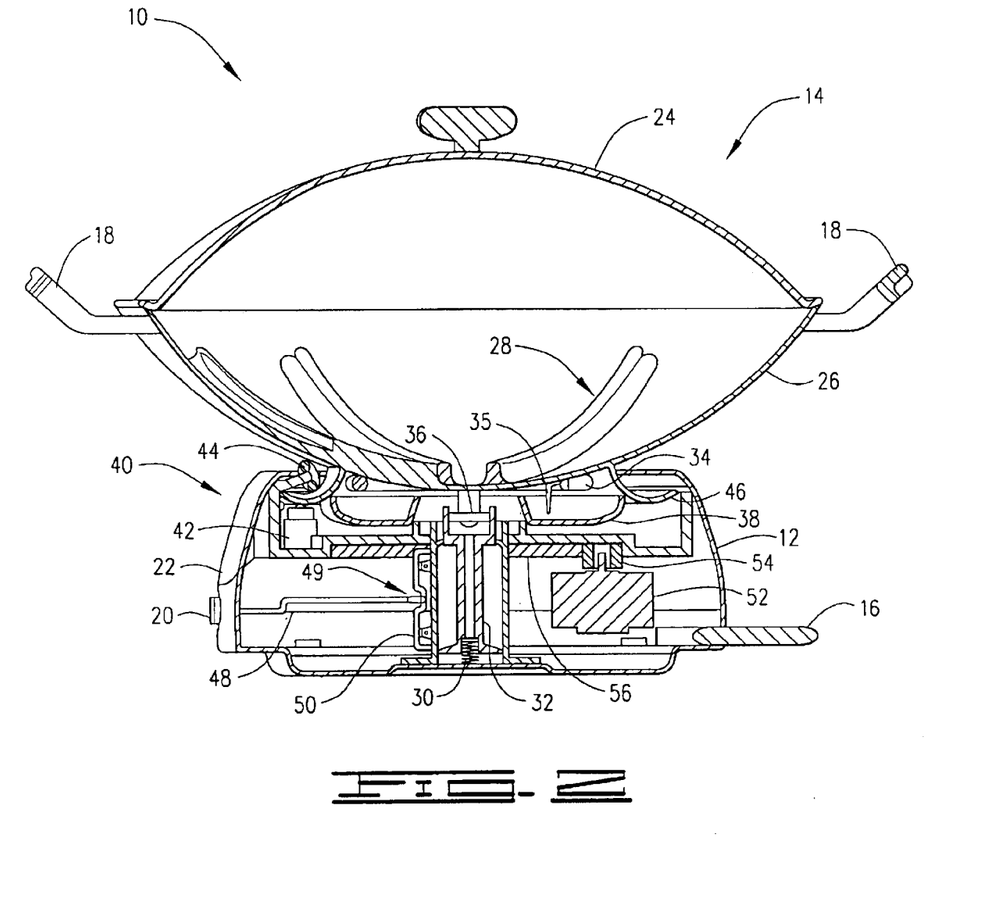
FIG. 2 shows a side cutaway view of a cooking apparatus in an upright position according to an embodiment of the present invention.

A cooking apparatus 10 according to an embodiment of the present invention is shown in FIG. 1. A side cutaway view of the embodiment of the invention shown in FIG. 1 is shown in FIG. 2. In FIG. 1 and FIG. 2, the cooking apparatus 10 is in a non-extended position. The cooking apparatus 10 shown in FIG. 1 includes, but is not limited to, a cooking surface 14 upon which or within which food may be placed, a base 12 upon which the cooking surface 14 may rest, a power cord 16 for supplying electrical power to the cooking apparatus 10, handles 18 connected to the cooking surface 14, a release button 20, which will be explained in greater detail below, and a control panel 22.

In the embodiment of the invention shown in FIG. 1, the cooking surface 14 is configured as a wok and, thus, may be circular, spherical, parabolic or curved in shape. However, the cooking surface 14 need not take the shape of a wok. According to other embodiments of the present invention, the cooking surface 14 may take the shape of another type of bowl, a pan, a skillet, a baking dish, and the like, and thus may be rectangular, square, or may take the shape of any surface that can be used for cooking.

A side cutaway view of the cooking apparatus 10 according to an embodiment of the present invention is shown in FIG. 2. In the embodiment of the invention shown in FIG. 2, the cooking surface 14 includes a lid 24 and a bowl 26. If the cooking apparatus 10 is to be configured as a wok, as shown in the embodiment of the invention of FIG. 2, the bowl 26 may be formed as a circular, spherical, parabolic, or any curved surface. Likewise, the lid 24 that rests upon the bowl 26 to cover the bowl 26 may be of a similar shape.

The cooking surface 14 may be made from a variety of materials. For example, the cooking surface 14 may be made from various metals, such as, for example, stainless steel, aluminum and the like. According to another embodiment of the present invention, the cooking surface 14 may be made from glass or plastic. Additionally, the cooking surface 14 may be coated with a non-stick surface such as TEFLON, for example.

The bowl 26 may also be fitted with ribs 28 that aid in the tumbling of food, as will be explained in greater detail below. The ribs 28 may take a variety of shapes. For example, the ribs 28 may be curved or triangular "bumps" along an inner surface of the bowl 26, but can literally take any shape that will help food tumble as the bowl 26 is tilted or rotated.

According to an embodiment of the present invention, a heating element 34 may be coupled to the cooking surface 14. In the embodiment of the invention shown in FIG. 2, the heating element 34 is affixed to the bottom of the bowl 26. The heating element 34 may be affixed to the bowl 26 via welds or may be attached to the bowl 26 using fasteners, such as, for example, screws, brackets, rivets and the like. The heating element 34 receives electrical power through wires (not shown) extending from a power cord 16 through a shaft 32. The wires may attach to a heating element tab 35. Because the heating element 34 is physically attached to the bowl 26 in the embodiment of the invention shown in FIG. 2, the heat generated by electricity moving through the heating element 34 is transferred to the bowl 26 via conduction.

According to other embodiments of the present invention, the heating element 34 need not be physically coupled, affixed or attached to the cooking surface 14. The heating element 34 may be disposed adjacent to, but not physically connected to, the cooking surface 14 and may transfer heat to the cooking surface 14 through the air. According to embodiments of the present invention, heat may be transferred from the heating element via radiation, convection or conduction.

According to yet another embodiment of the present invention, no heating element need be included with the cooking apparatus 10. In this embodiment, heat is derived from an external source. For example, in this embodiment, the cooking apparatus 10 may be placed in an oven and may derive its heat from the oven.

The base 12 includes a variety of elements for, among other things, effecting movement and position of the cooking surface 14. In the embodiment of the present invention shown in FIG. 2, the cooking surface 14 includes a lip 46 located on an outer surface of the bowl 26, attached to which is a coupling 40. In the embodiment of the present invention shown in FIG. 2, the coupling 40 includes rollers 44 and a ball plunger 42. The lip 46 may be positioned in between the rollers 44 and the ball plunger 42 to facilitate movement and positioning of the cooking surface 14, as will be explained below.

A joint 36 may be affixed to the bowl 26, allowing the bowl to tilt or be positioned at a variety of angles and, thus, creating a pivot point around which the bowl 26 may move. According to an embodiment of the present invention, the bowl 26 may be tilted about 36°. The joint 36 is also disposed within a shaft 32 which, in a first position as shown in FIG. 2, compresses a spring 30. A tip of a lower portion of a stopper 50 extends just slightly over a bottom portion of the shaft 32, thereby maintaining the position of the spring and causing the shaft 32 to maintain the spring 30 in a compressed position. Also, by maintaining the shaft 32 in this position, the cooking surface 14 may rest evenly on the base 12.

The joint 36 may be implemented using a variety of joint types. For example, the joint 35 may be a universal joint, a ball-and-socket joint, expansion joints, rotary joints, screw joints, prismatic joints, revolute joints, other movable joints and the like. Any joint that allows the cooking surface 14 to move, tilt or rotate freely may be used.

Although the cooking apparatus 10 shown in the embodiment of FIGS. 1 and 2 uses a power cord 16 for the supply of electrical power, such as, for example, AC power from a standard wall outlet, the cooking apparatus 10 may obtain power from a variety of sources. For example, other types of electrical power may supply power to the cooking apparatus 10. The cooking apparatus 10 may be powered by DC power, such as, for example, by one or more batteries or by an AC-to-DC converter. According to another embodiment of the present invention, the cooking apparatus 10 may be powered using mechanical power, such as, for example, wind-up power using springs and gears.

According to another embodiment of the present invention, the cooking apparatus 10 may be solar or thermal powered. Solar powering the cooking apparatus 10 may be useful when the cooking apparatus 10 is used as a portable device at a remote location. Thermal powering of the cooking apparatus 10 may be useful in those situations when the cooking apparatus 10 is placed in an oven or over a fire.

Figure 3:
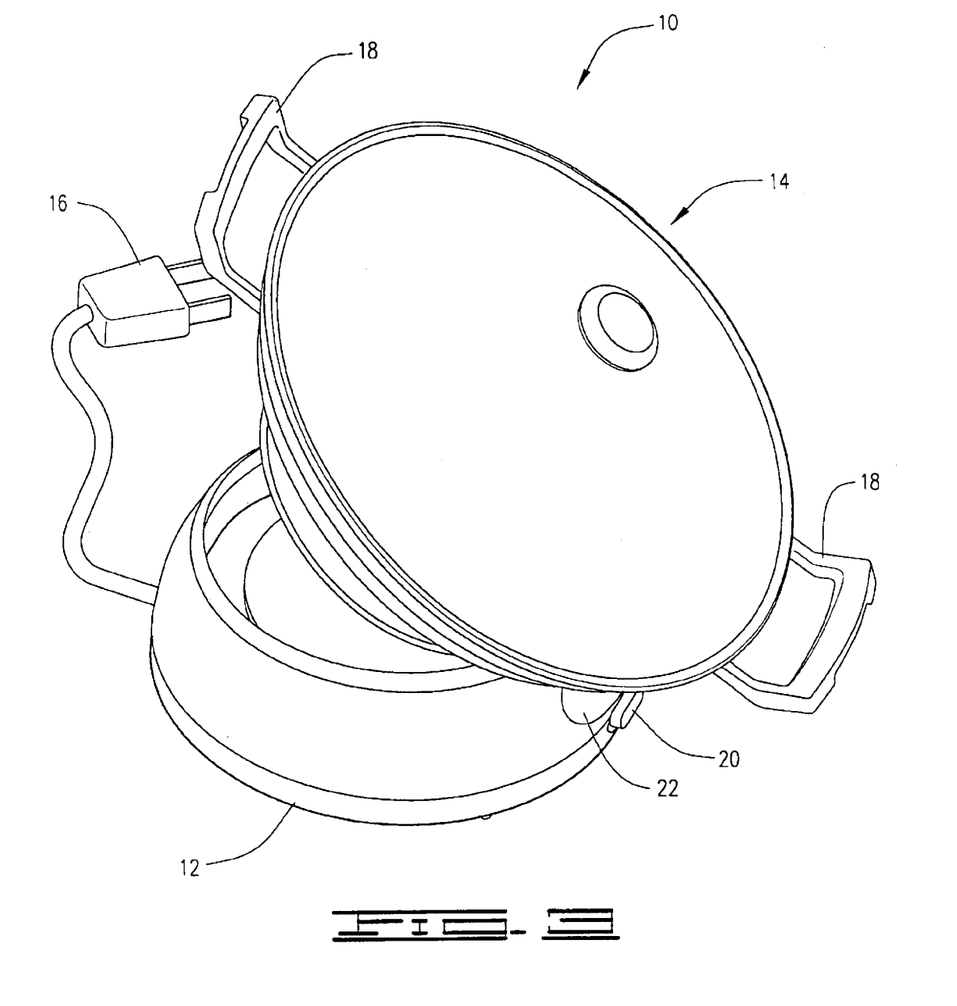
FIG. 3 shows a perspective view of a cooking apparatus in a tilted position according to an embodiment of the present invention.

The cooking apparatus 10 may be seen in its elevated and tilted position according to an embodiment of the present invention in FIG. 3. As shown in FIG. 3, the cooking surface 14 extends slightly away from the base 12 and is positioned at an angle with respect to the base 12.

Figure 4:
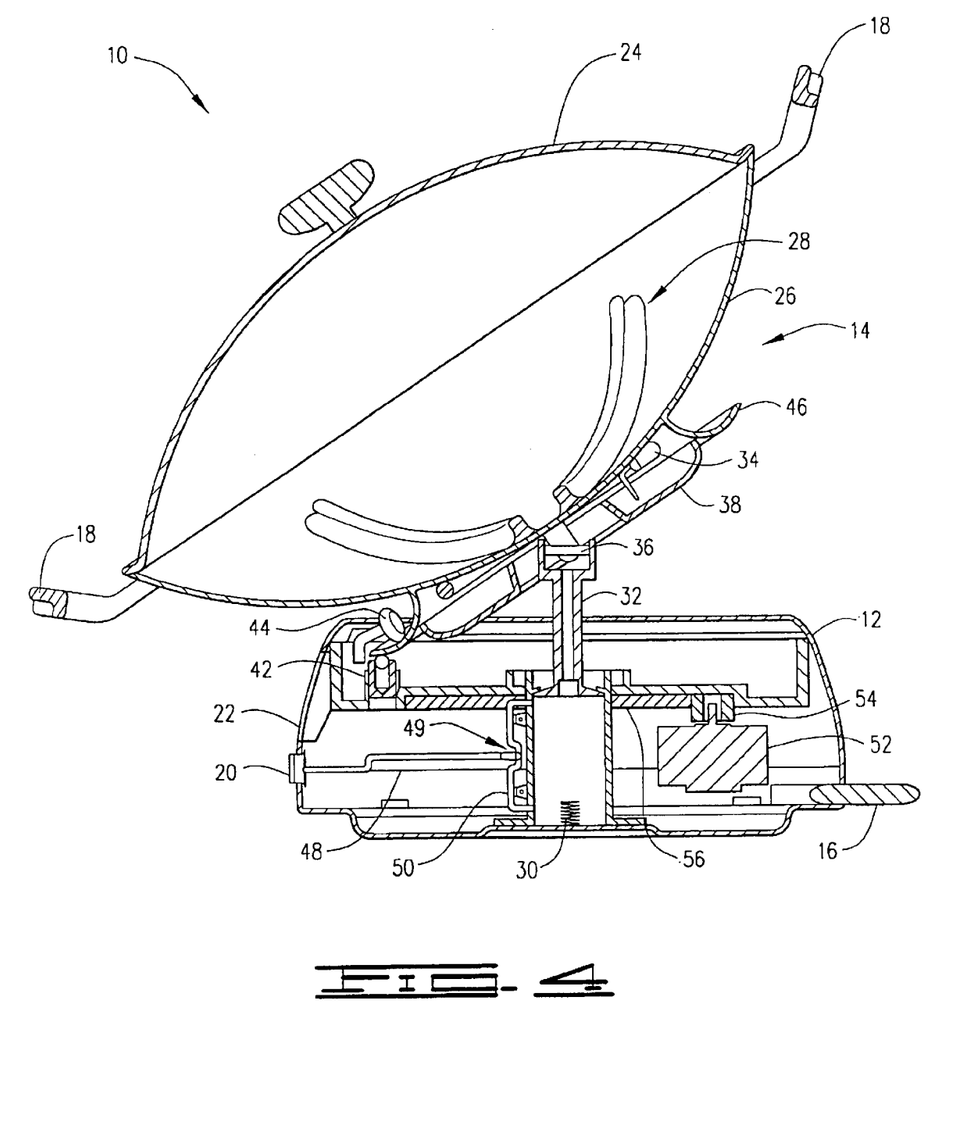
FIG. 4 shows a side cutaway view of a cooking apparatus in a tilted position according to an embodiment of the present invention.

A side cutaway view of the embodiment of the invention shown in FIG. 3 may be seen in FIG. 4. In order to dispose the cooking apparatus 10 in the position seen in FIG. 4, the release button 20 is depressed, thereby causing a linkage 48 to extend into a hinge 49. The motion of the linkage 48 extending into the hinge 49 causes both upper and lower portions of the stopper 50, the upper and lower portions of the stopper 50 being connected by the hinge 49, to rotate toward the linkage 48. Accordingly, the tip of the lower portion of the stopper 50 is pulled away from the shaft 32, thereby allowing the compressed spring 30 to push the shaft 32 toward the bowl 26.

According to the embodiment of the invention shown in FIGS. 3 and 4, as the shaft 32 extends due to the force of the spring 30, the shaft 32, in turn, pushes up on the bowl 26 and positions the bowl 26 slightly above the bowl's resting position on the base 12. Then, a user may pull up on the handles 18 attached to the bowl 26 to bring the bottom portion of the shaft 32 above a tip of an upper portion of the stopper 50. Thus, the stopper 50 will prevent the shaft 32 from dropping back down toward the spring 30 until the release button 20 is again depressed. In this position, the cooking surface 14 extends fully away from the base 12. A user may then tilt the cooking surface 14, which is possible because of the joint 36 affixed to the bowl 26 and disposed within the shaft 32, such that the lip 46 becomes disposed in between the rollers 44 and ball plunger 42. The rollers 44 and ball plunger 42 maintain the cooking surface 14 in a tilted position.

The shaft 32 may travel varying distances depending on the nature of the spring 30. For example, using a relatively small spring 30, the shaft 32, when released from its position maintaining the spring 30 in compression by depressing the release button 20, may travel a relatively short distance and be pushed by the spring 30 just enough distance so that it rests just past the tip of the lower portion of the stopper 50. The shaft 32 may still maintain the spring 30 in compression, although far less compression than when the shaft 32 is locked down by the stopper 50, and will thus be prevented from falling back toward the spring 30 and becoming locked down by the stopper 50.

According to another embodiment of the present invention, using a relatively large spring 30, the shaft 32, when released from its position maintaining the spring 30 in compression by depressing the release button 20, may travel a relatively long distance and be pushed by the spring 30 a distance far enough so that it extends past the tip of the upper portion of the stopper 50. The shaft 32 will then be locked by the upper portion of the stopper 50, maintaining the cooking surface 14 in an extended position.

Using power supplied by the power cord 16, a motor 52 may rotate a pinion 54 which is coupled to a gear 56, causing the gear 56 to rotate. The rollers 44 and ball plunger 42 are attached to the gear 56 and rotate along with it and along the lip 46 of the cooking surface 14. Because the cooking surface 14 is attached to the shaft 32 via the joint 36, the joint 36 allowing movement of the bowl 26, the cooking surface 14 continuously tilts in a circular manner as the rollers 44 and the ball plunger 42 rotate about the lip 46. Thus, food located on or within the bowl 26 may be in motion during a cooking process. For example, food located within the bowl 26 may "tumble" about an inner surface of the bowl 26 while the bowl 26 continuously tilts as the rollers 44 and the ball plunger 42 of the coupling 40 travel circularly around the lip 46. If the bowl 26 is equipped with ribs 28, as the bowl 26 is tilted and food begins to tumble or toss, the ribs 28 may aid in the tumbling, tossing or other movement of the food as the food comes into contact with the ribs 28.

According to another embodiment of the present invention, the coupling 40 may rotate the cooking surface 14. Rather than simply tilting the bowl 26 as the coupling 40 travels around the lip 46, the coupling 40 may be frictionally or otherwise attached to the lip 46 or some portion of the bowl 26 so that the cooking surface not only tilts but rotates as well. According to this embodiment of the present invention, the cooking surface 14 need not tilt at all. The cooking surface 14 may be maintained in an upright position while it is rotated by the coupling 40.

Additionally, the coupling may travel with the cooking surface 14 or may be maintained in a stationary position. In an embodiment of the present invention where the coupling is maintained in a stationary position, elements of the coupling, such as, for example, the rollers 44 and the ball plunger 42 or other elements, may rotate the cooking surface 14 to provide movement to the food being cooked therein.

Figure 5:
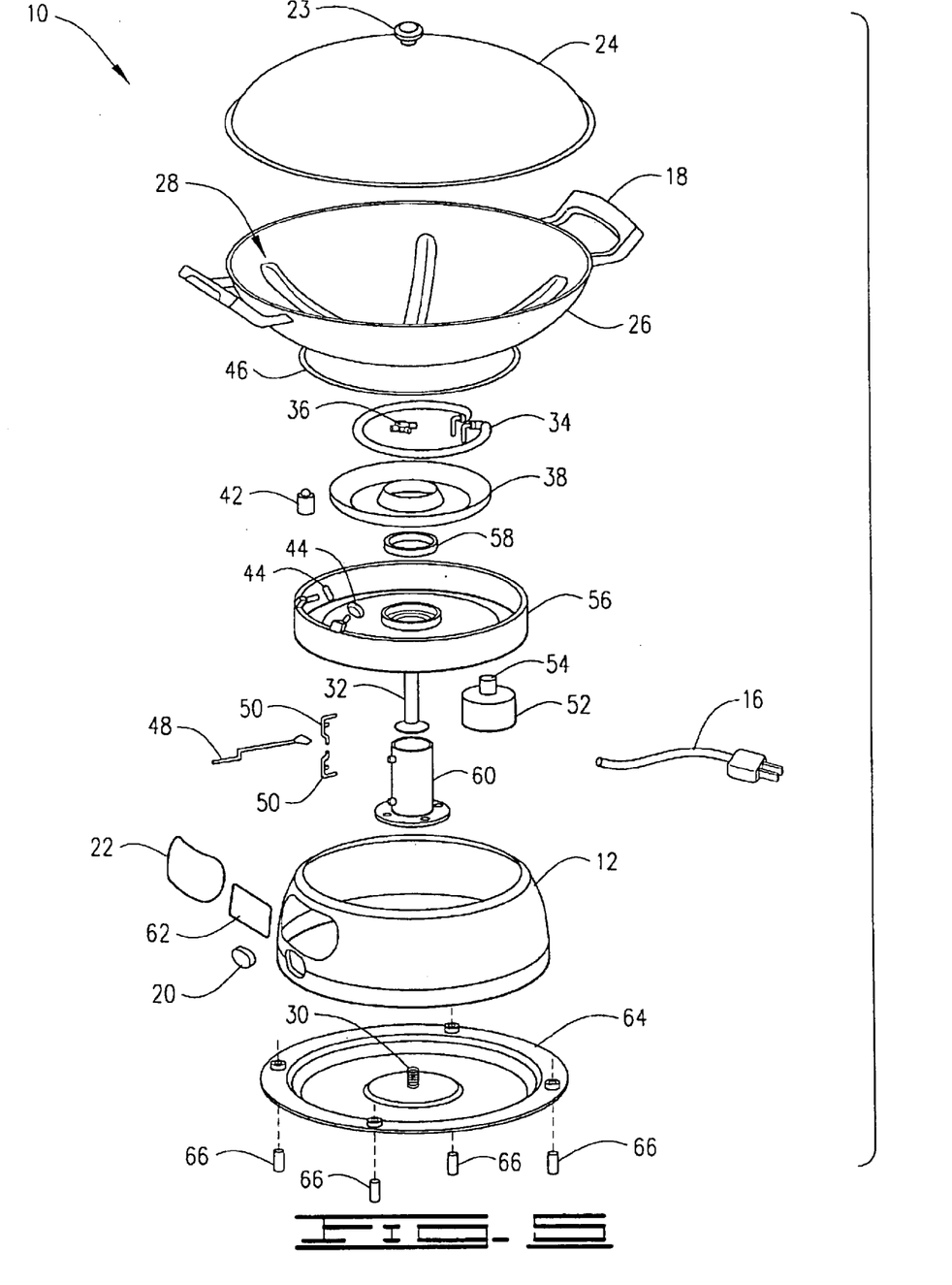
FIG. 5 shows an exploded view of a cooking apparatus according to an embodiment of the present invention.

An exploded view of the cooking apparatus 10 according to an embodiment of the present invention is shown in FIG. 5. The embodiment shown in FIG. 5 includes a lid 24 which rests on a bowl 26. The lid may include a knob 23. The bowl 26 may include ribs 28 that aid in the tumbling of food as the cooking surface tilts, such as, for example, continuously along its perimeter or in a circular manner. Attached to the bowl 26 are handles 18.

Coupled to the bowl 26 is a heating element 34. The heating element 34 is covered by a heating element cover 38. Both the heating element 34 and the heating element cover 38 may be affixed within an interior portion of a lip 46 which is affixed to the bottom of the bowl 26.

A joint 36 is disposed within a bearing 58 which rests on a bearing hub 60. The joint 36, bearing 58 and bearing hub 60 allow the bowl 26 to tilt as the rollers 44 and ball plunger 42 rotate with the gear 56 around the lip 46. According to another embodiment of the present invention, the coupling 40 causes the bowl 26 or cooking surface 14 to rotate, either in an upright position or while tilted. The gear 56 rotates in response to a pinion 54 to which the gear 56 is coupled, which itself rotates due to its being coupled to the motor 52.

The joint 36 is coupled to the shaft 32. The shaft 32 is maintained in a first or second position by a stopper 50 which is coupled to a linkage 48. In the first position, the shaft 32 is disposed within an interior portion of the base 12. In the second position, the a portion of the shaft 32 extends out of the interior portion of the base 12.

The linkage 48 is coupled to a release button 20, and the stopper 50 is activated by the linkage 48 when the release button 20 is depressed. All of the elements affecting motion and positioning of the bowl 26 are disposed within an interior portion of the base 12. The motor receives its power via power cord 16.

In addition, a control panel 22, which may contain buttons, switches and the like, may operate circuitry on printed circuit board 62. The control panel 22, together with the printed circuit board 61, may allow the user to control a variety of functions implemented in the cooking apparatus 10. For example, functions that may be implemented in the cooking apparatus 10 and controlled using the control panel 22 via control electronics located on the printed circuit board 61 include, but are not limited to, cooking temperature, cooking time, motor speed and the like.

When the bowl 26 is resting on the base 12, the shaft 32 maintains spring 30 in a compressed position. The base 12 itself may rest on a base cover 64 which may be provided with feet 66.

A cooking apparatus 10 according to another embodiment of the present invention may be seen in FIG. 6. The embodiment of the present invention shown in FIG. 6 is similar to that shown in FIG. 5. The embodiment of the present invention shown in FIG. 6 includes a removable bowl 27, which may be designed to rest within the interior portion of the bowl 26. Using the embodiment of the present invention shown in FIG. 6, once cooking is complete, the removable bowl 27 may be removed from the bowl 26 for convenience. For example, food that has been cooked may remain in the removable bowl 27. The removable bowl 27 may then be brought to a table or other place convenient for serving the cooked food. Additionally, the removable bowl 27 may be removed from the bowl 26 for easy cleaning.

Figure 7:
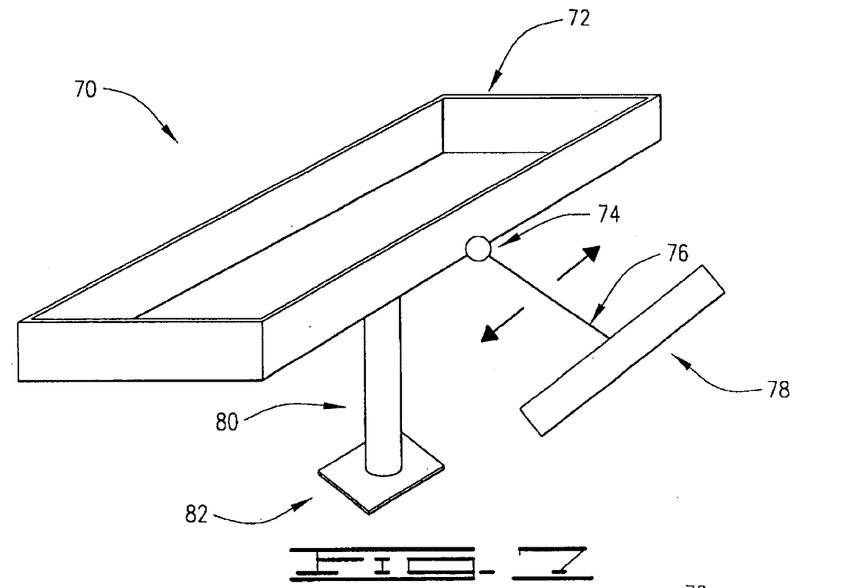
FIG. 7 shows a perspective view of a cooking apparatus according to another embodiment of the present invention.

A cooking apparatus 70 according to another embodiment of the present invention may be seen in FIG. 7. According to the embodiment of the invention shown in FIG. 7, a cooking surface 72 is pivotally attached to a shaft 80 which rests on a base 82. In the embodiment shown in FIG. 7, the cooking surface 72 takes the form of a rectangular baking dish or baking pan. However, the cooking surface 72 may take any shape that facilitates the cooking of food.

A coupling 74 is attached to the cooking surface 72. Attached to the coupling 74 is a linkage 76 which is also affixed to a motor or actuator 78. The motor or actuator 78 may, through the linkage 76, cause the coupling 74 to move back and forth along a portion of the cooking surface 72, thereby causing the cooking surface 72 to rock about the pivot point on the shaft 80. Thus, food existing within the cooking surface 72 may roll back and forth.

Figure 8:
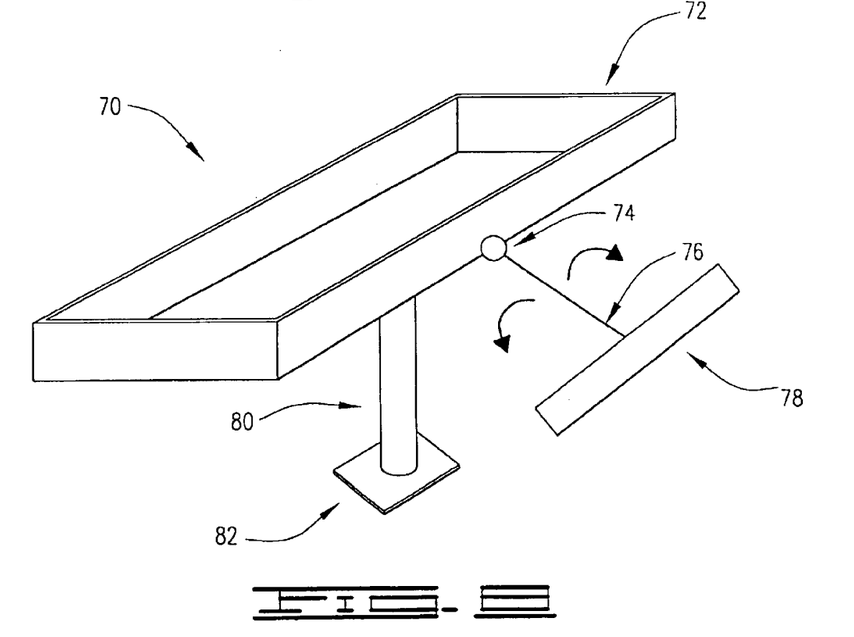
FIG. 8 shows a perspective view of a cooking apparatus according to another embodiment of the present invention.

A cooking apparatus 70 according to another embodiment of the present invention may be seen in FIG. 8. The embodiment of the invention seen in FIG. 8 is similar to that seen in FIG. 7. However, in FIG. 8, the motor or actuator 78 moves rotationally and causes the linkage 76 to rotate the coupling 74 in order to effect movement of the cooking surface 72.

The advantages of embodiments of the present invention may readily be seen. Because the cooking surface is in motion during a cooking process, food located within the cooking surface is also in motion, i.e., it tumbles, is tossed, or otherwise moves while it is being cooked. Such motion allows for more thorough cooking and relieves a cook from having to constantly supervise a cooking process. A cook may be freed to engage in other activities while the cooking apparatus according to embodiments of the invention described herein perform duties that would otherwise be performed by a cook, such as, for example, turning over, tossing, shaking or otherwise moving food that is cooking so that the food cooks evenly.

Furthermore, in the embodiments of the present invention in which the cooking surface is continuously tilted in a circumferential manner, and not rotated, the concern that wires providing electrical power might become entangled is eliminated. Because there is no rotation of the cooking surface, the heating element, or the wires providing power to the heating element in these embodiments, the use of slip rings or other such devices that are typically required in rotating, powered equipment is eliminated.

Moreover, for cooking techniques such as deep frying, embodiments of the present invention may cook food in a healthier manner by decreasing the amount of time the cooked food spends in the frying oil. For example, in traditional deep frying cooking apparatus, a quantity of oil is heated in a container and food items are place in the oil until they are cooked. This technique typically results in food that is saturated in oil, sometimes to an extent that is unpalatable or unhealthy for many people. In contrast, if embodiments of the present invention are used for deep frying, such embodiments can tumble or toss food into and out of the frying oil, thereby resulting in food that has less oil content than food cooked in devices of the prior art, which may be healthier and more palatable for many people.

Embodiments of the present invention provide numerous advantages over the prior art. For example, in many of the prior art devices, food is enclosed within a container and rotated in a vertical plane for providing movement to the food while cooking. Such devices preclude open air cooking. Moreover, unless the prior art container is transparent, a cook or chef is precluded from seeing the state of the food, which may result in undercooked or overcooked food. Even if the prior art container is transparent, visibility may be limited.

In contrast, because embodiments of the present invention are tilted or rotated in a horizontal plane, rather than a vertical plane, food cooking on or within the cooking surface need not be covered or enclosed within a container since there is no concern that the food will fall of off or out of the cooking surface. Thus, the food may be observed while cooking if desired, resulting in more accurately cooked food. In addition, open-air cooking is realizable.

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. A cooking apparatus comprising:
   a cooking surface for receiving food;
   a motion element for providing movement to the cooking surface; and
   a coupling fixedly attached to the motion element, wherein the coupling traverses a portion of the cooking surface, and comprises at least one roller and a ball plunger.

2. The cooking apparatus of claim 1, wherein the coupling is movably attachable to the cooking surface.

3. The cooking apparatus of claim 1, wherein the cooking surface tilts.

4. The cooking apparatus of claim 2, wherein the cooking surface tilts when the cooking surface is attached to the coupling.

5. The cooking apparatus of claim 1, wherein the portion of the cooking surface traversed by the coupling is a circumferential portion of the cooking surface.

6. The cooking apparatus of claim 1, wherein the portion of the cooking surface traversed by the coupling is a periphery of the cooking surface.

7. The cooking apparatus of claim 1, wherein the cooking surface is curved.

8. The cooking apparatus of claim 1, wherein the cooking surface is rectangular.

9. The cooking apparatus of claim 1, wherein the cooking surface comprises a first cooking surface and a second cooking surface.

10. The cooking apparatus of claim 1, wherein the first cooking surface is an outer cooking surface and the second cooking surface is an inner cooking surface.

11. The cooking apparatus of claim 1, wherein the cooking surface is a wok.

12. The cooking apparatus of claim 1, further comprising a heating element coupled to the cooking surface.

13. The cooking apparatus of claim 12, wherein the heating element is coupled to the cooking surface via air.

14. The cooking apparatus of claim 12, wherein the heating element is coupled to the cooking surface via fasteners.

15. The cooking apparatus of claim 12, wherein the heating element is coupled to the cooking surface via welds.

16. The cooking apparatus of claim 12, wherein heat is transferred from the heating element to the cooking surface via radiation.

17. The cooking apparatus of claim 12, wherein heat is transferred from the heating element to the cooking surface via conduction.

18. The cooking apparatus of claim 12, wherein heat is transferred from the heating element to the cooking surface via convection.

19. The cooking apparatus of claim 1, wherein a motion of the motion element is rotational.

20. The cooking apparatus of claim 1, wherein a motion of the motion element is linear.

21. The cooking apparatus of claim 1, wherein the motion element rotates the cooking surface via the coupling.

22. The cooking apparatus of claim 1, wherein the motion element causes the coupling to traverse a portion of the cooking surface.

23. The cooking apparatus of claim 1, wherein the motion element shakes the cooking surface via the coupling.

24. The cooking apparatus of claim 1, wherein the motion element moves the cooking surface via the coupling.

25. The cooking apparatus of claim 1, wherein the motion element is electrically powered.

26. The cooking apparatus of claim 1, wherein the motion element is battery powered.

27. The cooking apparatus of claim 1, wherein the motion element is mechanically powered.

28. The cooking apparatus of claim 1, wherein the motion element comprises:

a motor;

a pinion coupled to the motor; and a gear coupled to the pinion.

29. The cooking apparatus of claim 1, further comprising:

a joint upon which the cooking surface is pivotally attached;

a shaft disposed adjacent the cooking surface;

a spring disposed adjacent the shaft, and a stopper for maintaining a position of the shaft, wherein the joint is disposed adjacent the shaft.

30. The cooking apparatus of claim 29, wherein the joint is a universal joint.

31. The cooking apparatus of claim 29, wherein the stopper maintains the shaft in a first position and a second position.

32. The cooking apparatus of claim 31, wherein the spring is in compression when the shaft is in the first position.

33. The cooking apparatus of claim 31, wherein the spring acts upon the shaft to force the shaft into the second position.

34. The cooking apparatus of claim 33, wherein the second position of the shaft allows the cooking surface to be positioned into the coupling.

35. A wok comprising:

a cooking surface;

a motion element for providing rotational motion to the cooking surface; and a coupling fixedly attached to the motion element, wherein the coupling traverses a periphery of the cooking surface, and further wherein the cooking surface is pivotally attached to a joint.

36. The wok of claim 35, wherein the cooking surface comprises a first member and a second member.

37. The wok of claim 35, further comprising a heating element coupled to the cooking surface.

38. The wok of claim 37, wherein the heating element is welded to the curved cooking surface.

39. The wok of claim 36, wherein the cooking surface is curved.

* * * * *